United States Patent [19]

Schlosser

[11] Patent Number: 4,576,140
[45] Date of Patent: Mar. 18, 1986

[54] ASH CATCHER FOR CHARCOAL GRILL

[75] Inventor: Erich J. Schlosser, Lindenhurst, Ill.

[73] Assignee: Weber-Stephen Products Co., Palatine, Ill.

[21] Appl. No.: 752,948

[22] Filed: Jul. 8, 1985

[51] Int. Cl.⁴ .............................................. A47J 37/00
[52] U.S. Cl. .................................. 126/25 R; 126/9 R; 126/9 B; 248/152; 248/150; 108/47
[58] Field of Search .................. 126/25 R, 41 R, 242, 126/9 R, 9 B; 108/46, 47, 137, 156; 248/152, 150, 149, 509

[56] References Cited

U.S. PATENT DOCUMENTS 4,337,751  7/1982  Sampson et al. ................. 126/25 R
4,498,452  2/1985  Schlosser et al. ............ 126/25 R X Primary Examiner—Randall L. Green
Attorney, Agent, or Firm—Robert E. Wagner; Ralph R. Rath

[57] ABSTRACT

A portable charcoal grill includes a bowl and a tripod leg arrangement with an ash catcher supported by the legs. The ash catcher includes a pan that is wedged into the leg structure and is held in the wedged position by spring clips carried by the legs and having arms engaging the bottom of the pan.

4 Claims, 3 Drawing Figures

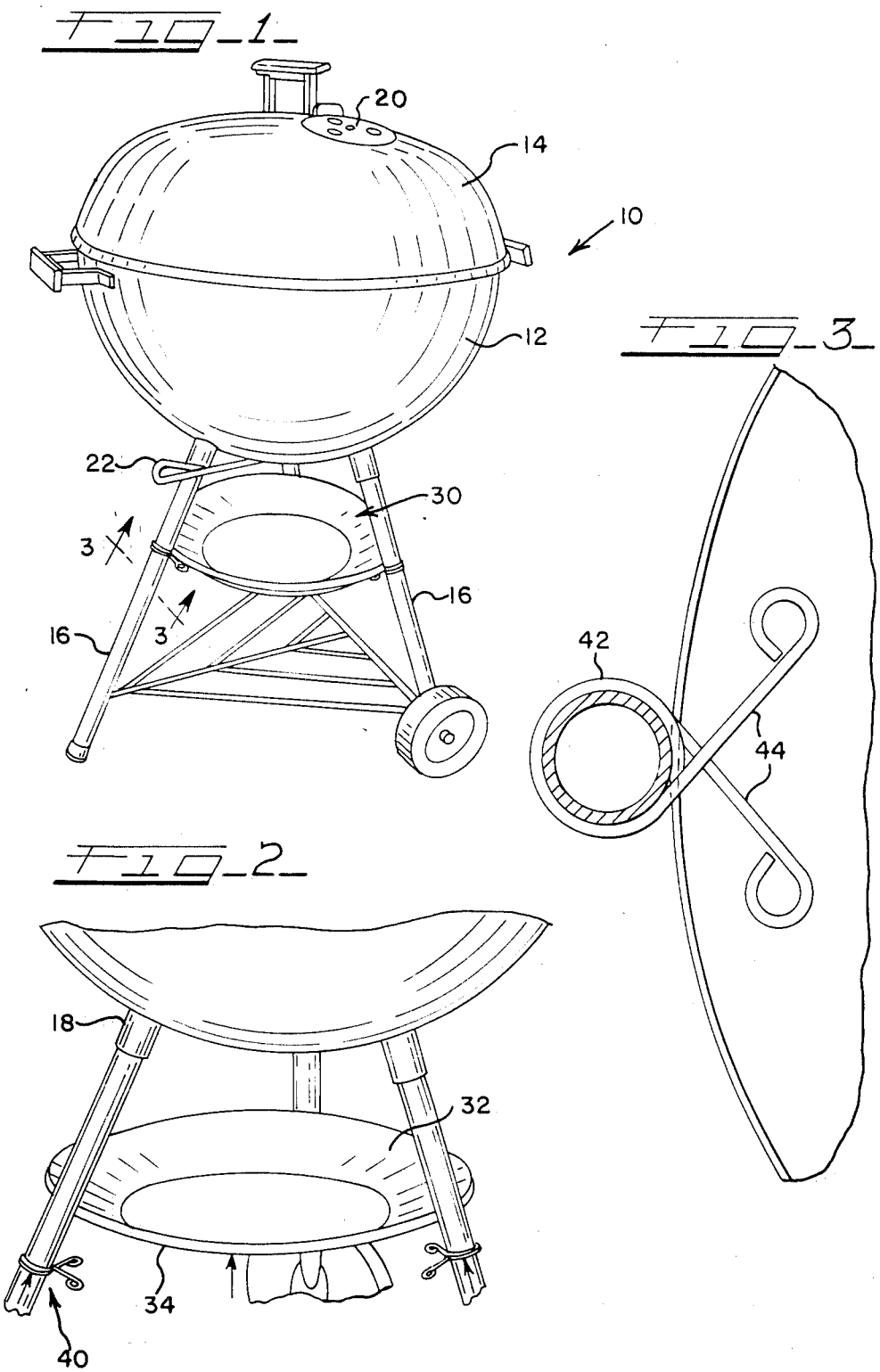

ASH CATCHER FOR CHARCOAL GRILL

DESCRIPTION

1. Technical Field

The present invention relates generally to outdoor cooking devices and, more particulary, to an improved ash catcher for a portable charcoal grill.

2. Background of the Invention

Charcoal grills have been in existence for several decades and usually consist of a lower chamber that has a supporting grid for supporting charcoal briquettes that are ignited to provide the heat for food supported on a cooking grid, located above the charcoal grid. Usually, this type of unit incorporates vent openings adjacent the bottom of the firebox for providing the necessary air for ignition and burning of the charcoal. The vent openings are also utilized for disposing of the ashes that accummulate in the bottom of the chamber.

One of the more successful types of outdoor charcoal cooking units has been marketed for a number of years by the Assignee of the present invention and consists of a generally hemispherical upwardly-opening lower bowl which has a grid adjacent the bottom for supporting charcoal briquettes and a cooking grid located adjacent the upper rim of the bowl. A cover is usually removably supported on the rim of the bowl and the bowl has vent openings adjacent the lower portion, which not only provides the necessary air for combustion of the charcoal briquettes but also a means for discarding the ashes that accummulate in the lower portion of the bowl. The charcoal grill marketed by the Assignee of the present invention includes a tripod leg supporting structure consisting of three legs that are received in sockets that are connected to the outer surface of the bowl and define a generally triangular configuration for the supporting structure.

The charcoal grill sold by the Assignee of the present invention also includes an ash catcher that is supported on the respective legs and the ash catcher is formed of a non-corrosive material, such as aluminum. The ash catcher has three generally L-shaped slots extending from the outer periphery which are adapted to receive the legs of the support structure so that the ash catcher can be manipulated into position by inserting the ends of the slots around the legs and than rotating the ash catcher so that the bases of the L-shaped slots receive the legs.

Because of the lightweight construction of the particular types of ash catchers, difficulties have been encountered in maintaining the ash catcher in a fixed position, particularly under windy environments.

Thus, the Assignee of the present invention has developed a specially-designed spring clip which has a circular portion surrounding and frictionally gripping the respective legs of the support structure and being located above the upper surface of the ash catcher to prevent the ash catcher from being raised and tilted during high wind conditions.

While such an arrangement has been proven to be satisfactory for essentially fixedly-securing the ash catcher on the tripod leg arrangement, the manufacturer of this type of unit, as shown in U.S. Pat. No. 4,416,248, is constantly striving to reduce costs and increase its competitive position with respect to this type of grill.

SUMMARY OF THE INVENTION

According to the present invention, a new ash catcher has been developed which is easier to manufacture and results in a more sturdy structure than what has heretofor been known for units of the type. The grill consists of a lower hemispherical bowl supported on three legs that are arranged in a tripod configuration with a cover on the bowl and an ash catcher supported on the tripod leg structure.

According to the primary aspect of the invention, the ash catcher consists of a generally circular disk that has a peripheral rim thereon which provides the necessary rigidity for the unit and the disk is moved upwardly from a lower position into engagement with each of the inner surfaces of the three leg structures to be wedged therein. A plurality of spring clips, equal in number to the leg structures, are supported on the legs and have inwardly-directed arms which are positioned below the ash catcher and act to maintain the ash catcher in the wedged position in the tripod leg structure.

With this arrangement, the construction of the ash catcher is significantly simplified since the punching operation of providing the L-shaped slots is eliminated. Furthermore, the ash catcher is significantly more rigid since it is a one-piece structure that is still preferably formed of non-corrosive material that has a downwardly-directed rim around the periphery thereof.

With the construction so far described, the ash catcher can be formed with a minimum amount of material, less than what was previously necessary, and the formation of the slots can be eliminated. Since the ash catcher has its periphery located within the triangular leg structure, a further reduction in materials is achieved over what was previously utilized by the Assignee of the present invention.

BRIEF DESCRIPTION OF SEVERAL VIEWS OF DRAWINGS

FIG. 1 is a perspective view of the charcoal grill having the ash catcher of the present invention incorporated therein;

FIG. 2 is an enlarged fragmentary perspective view showing the details of the ash catcher and its supporting mechanism; and, FIG. 3 is an enlarged cross-sectional, as viewed along line 3—3 of FIG. 1.

DETAILED DESCRIPTION

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the broad aspect of the invention to the embodiment illustrated.

FIG. 1 is a perspective view of a charcoal grill, generally designated by reference numeral 10, of the type that is disclosed in U.S. Pat. No. 4,416,248, incorporated herein by reference. The grill 10 includes a generally spherical bowl 12 that has a cover 14 and is supported by three substantially identical legs 16 that are outwardly-inclined and arranged in a tripod configuration. Each of the legs is received into a socket 18 that is secured to the periphery of the bowl 12. The cover 14 has vent openings (not shown) that are adapted to be opened and closed by a rotatable vent closure 20. The interior of the bowl has a charcoal grid supported adjacent the lower end thereof, which supports the charcoal above the bottom of the bowl so that air is drawn into the vent openings (not shown) to provide the proper combustion for the charcoal briquettes supported on the charcoal grid. A cooking grid (not shown) is located adjacent the peripheral rim of the bowl 12, as is more fully disclosed in the above-mentioned patent.

The bowl 12 has elongated slots (not shown) that define vent openings which are adapted to be covered by generally inverted, V-shaped arms that are connected to a rotatable member which has a handle 22 secured thereto. As disclosed in the above patent, the handle may be manipulated to move the ashes collected in the bottom of bowl 12 towards the vent slots and an ash catcher 30 is provided for collecting the ashes that fall through the slots. As indicated above, in the prior art-type of charcoal grills utilizing the tripod leg structure support, the ash catcher is designed such that it can be releasably supported on the three legs through the use of three generally L-shaped slots which receive the legs.

However, in practice, it has been found that because of the lightweight construction, the ash catcher has a tendency to move and vibrate under windy conditions and, in fact, under some conditions, may actually become detached from the leg structure. Furthermore, the ash catcher requires several production steps, including the stamping of the slots extending from the periphery.

According to the present invention, a simplified ash catcher has been developed which can easily be assembled onto the tripod-type leg structure without any additional tools. The new ash catcher is constructed so as to be a one-piece unit that is rigidified around the periphery thereof by a flange or rim and is designed to be wedged into the tripod leg structure with supporting clips holding the ash catcher in the wedged position. In the illustrated embodiment, the supporting clips are in the form of a circular spring that surrounds each leg and frictionally grips the leg with the spring having a pair of arms that are grippable to release the clips from the legs and these arms also acts as the support for the ash catcher.

As illustrated in FIG. 2, the ash catcher 30 comprises a generally circular dish or pan 32 that has a downwardly-directed peripheral rim or lip 34. The peripheral lip 34 is adapted to engage the inner surface of each leg and to be wedged in the tripod leg structure.

The ash catcher is held in the wedged position by three spring clips 40 respectively associated with the three legs. Each spring clip 40 includes a circular spring portion 42 and a pair of arms 44. The spring portion 42 is adapted to encircle and frictionally grip the leg 16 and can be released by squeezing the arms 44.

In assemblying the ash catcher, the three spring clips are initially positioned as shown in FIG. 2 below the final position for the ash catcher. The ash catcher is then wedged into position as shown in FIG. 2 and the clip arms 44 are gripped and moved up into engagement with the lower side of the ash catcher to hold it in wedging engagement with the legs.

In the assembled condition, the ash catcher is held in a fixed position and cannot move or vibrate during windy conditions.

While the ash catcher has been shown associated with a tripod leg arrangement, the concept could also be adapted in a four leg support arrangement so long as the legs are inclined outwardly.

I claim:

1. A portable grill including a spherical bowl having three supporting legs arranged in a tripod configuration and an ash catcher supported by said legs, said ash catcher comprising a circular disk having a peripheral edge engaging inner surfaces of said legs and a plurality of adjustable clips supported on said legs and having portions extending under and engaging a lower portion of said circular disk so that said circular disk is held in a wedged position in said tripod leg configuration by said adjustable clips.

2. A portable grill as defined in claim 1, in which each clip includes a circular spring portion surrounding and frictionally gripping a leg and a pair of integral arms extending inwardly under said circular disk.

3. In combination with a portable grill including a spherical bowl supported by three legs arranged in a tripod configuration and an ash catcher supported by said legs, the improvement of said ash catcher comprising a circular disk having a peripheral edge in engagement with inner surfaces of said legs and adjustable spring clips surrounding each of said legs and having arms extending inwardly of said legs under said disk so that said disk is held in a wedged position within the tripod leg configuration by said adjustable spring clips.

4. A portable charcoal grill including a bowl adapted to receive charcoal briquettes that produce ashes and having openings through which the ashes may be disposed and a plurality of outwardly-inclined circular legs supporting said bowl, and an ash catcher supported by said legs, the improvement of said ash catcher including a pan having an uninterrupted peripheral rim, said pan engaging and wedged along inner surfaces of each leg, and an adjustable spring clip supported on each leg and holding said pan on said legs, each spring clip comprising a circular portion encircling and frictionally gripping an associated leg, and a pair of arms extending from said circular portion and engaging a lower side of said pan.

* * * * *